United States Patent
Toya et al.

(10) Patent No.: US 11,038,357 B2
(45) Date of Patent: Jun. 15, 2021

(54) ELECTRICITY STORAGE SYSTEM WITH MONITORING AND CHARGING CIRCUITS

(71) Applicant: PANASONIC INTELLECTUAL PROPERTY MANAGEMENT CO., LTD., Osaka (JP)

(72) Inventors: Shoichi Toya, Hyogo (JP); Takeshi Nakashima, Hyogo (JP); Yohei Yamada, Osaka (JP); Masaharu Kawakatsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 322 days.

(21) Appl. No.: 15/901,641

(22) Filed: Feb. 21, 2018

(65) Prior Publication Data
US 2018/0248389 A1   Aug. 30, 2018

(30) Foreign Application Priority Data
Feb. 24, 2017   (JP) .............................. JP2017-033436

(51) Int. Cl.
*H02J 7/00* (2006.01)
*H01M 10/44* (2006.01)
(Continued)

(52) U.S. Cl.
CPC ......... *H02J 7/0021* (2013.01); *H01M 10/441* (2013.01); *H01M 50/20* (2021.01);
(Continued)

(58) Field of Classification Search
CPC ..... H01M 10/46; H01M 2/1072; G06F 1/263; G06F 1/30; H02J 7/0003
See application file for complete search history.

(56) References Cited

U.S. PATENT DOCUMENTS

| 2014/0266000 A1* | 9/2014 | Meoli | ..................... H02J 7/027 320/101 |
| 2015/0171632 A1* | 6/2015 | Fry | .......................... H02B 1/26 307/22 |

(Continued)

FOREIGN PATENT DOCUMENTS

JP        2013-240156 A     11/2013

*Primary Examiner* — Rexford N Barnie
*Assistant Examiner* — Elim Ortiz
(74) *Attorney, Agent, or Firm* — McDermott Will and Emery LLP

(57) ABSTRACT

An electricity storage system includes a main body and a portable unit. The main body includes a casing, a first storage battery module that stores power, and a first terminal unit to supply the power. The portable unit includes a second terminal unit and a second storage battery module, and is attachable to and detachable from the first terminal unit. The second terminal unit is electrically connectable to the first terminal unit and receives the power supplied from the main body. The second storage battery module has a storage capacity less than the first storage battery module. The portable unit further includes a charging controller, upon determination of power supply from the system power supply has been stopped, the charging controller controls a charging rate for the second storage battery module to be charged at least one of a normal mode and a high-speed mode.

12 Claims, 13 Drawing Sheets

(51) Int. Cl.

| | |
|---|---|
| *H01M 2/10* | (2006.01) |
| *H02J 7/34* | (2006.01) |
| *H01M 50/20* | (2021.01) |
| *H01M 50/267* | (2021.01) |
| *H05B 47/185* | (2020.01) |

(52) U.S. Cl.
CPC ........... *H01M 50/267* (2021.01); *H02J 7/007* (2013.01); *H02J 7/0042* (2013.01); *H02J 7/0044* (2013.01); *H02J 7/342* (2020.01); *H01M 2220/30* (2013.01); *H05B 47/185* (2020.01)

(56) References Cited

U.S. PATENT DOCUMENTS

2016/0226277 A1* 8/2016 Wenger .................... H02J 7/007
2017/0098940 A1* 4/2017 Syouda .............. G01R 31/3835

* cited by examiner

ELECTRICITY STORAGE SYSTEM WITH MONITORING AND CHARGING CIRCUITS

CROSS REFERENCE TO RELATED APPLICATION

This application claims the benefit of priority of Japanese Patent Application Number 2017-033436 filed on Feb. 24, 2017, the entire content of which is hereby incorporated by reference.

BACKGROUND

1. Technical Field

The present disclosure relates to an electricity storage system which is connected to a power conditioner connected to a system power supply.

2. Description of the Related Art

Conventionally, an electricity storage system which is charged with power supplied from a system power supply, a photovoltaic cell or the like is available. For example, Japanese Unexamined Patent Application Publication No. 2013-240156 (Patent Literature 1) discloses a power supply device which charges a storage battery such as a lithium-ion battery with energy generated by a photovoltaic cell and supplies power to an electrical device. With this, even when a power failure occurs in the event of a disaster, etc., power can be generated using the photovoltaic cell.

SUMMARY

For example, in the event of a disaster, etc., a user may wish to carry an electricity storage device (electricity storage system) including a storage battery from a location in which the electricity storage device is installed to another location such as an evacuation center depending on the situation.

In this regard, a method for increasing the size of a storage battery or increasing the number of storage batteries is often used to increase the storage capacity of the electricity storage device, leading to an increase in the size of the electricity storage device. Therefore, carrying the electricity storage device may be difficult. If the electricity storage device is downsized, the storage capacity of the electricity storage device is reduced, which, for example, makes it difficult to continuously operate devices that consume large amounts of power, such as a lighting device and a refrigerator; thus, there is concern over a reduction in convenience of the electricity storage device.

Thus, the present disclosure provides an electricity storage system with improved convenience.

An electricity storage system according to one aspect of the present disclosure is connected to a power conditioner connected to a system power supply and includes: a main body including a first storage battery module, a casing, and a first terminal unit, the first storage battery module storing power supplied from the power conditioner, the casing enclosing the first storage battery module, the first terminal unit being used to supply the power; and a portable unit including a second terminal unit and a second storage battery module, the second terminal unit being electrically connectable to the first terminal unit and receiving the power supplied from the main body, the second storage battery module having a storage capacity less than a storage capacity of the first storage battery module and being charged with the power supplied from the main body via the second terminal unit, the portable unit being attachable to and detachable from the first terminal unit. The first terminal unit is located on the side of a side surface of the casing.

With the electricity storage system according to the present disclosure, the convenience is improved.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, electricity storage systems according to embodiments will be described in detail with reference to the drawings. Note that each of the embodiments described below shows a general or specific example. The numerical values, shapes, materials, structural elements, and the arrangement and connection of the structural elements, steps, the processing order of the steps, etc., shown in the following embodiments are mere examples, and are not intended to limit the present disclosure. Furthermore, among the structural elements in the following embodiments, structural elements not recited in any one of the independent claims indicating the broadest concepts are described as arbitrary structural elements.

Note that the figures are schematic diagrams and are not necessarily precise illustrations. Furthermore, in the figures, substantially identical elements are assigned the same reference signs, and overlapping description may be omitted or simplified.

In the following embodiments, the Z-axis direction is, for example, a vertical direction, and the positive direction of the Z-axis may be referred to as upward (above). The negative direction of the Z-axis may be referred to as downward (below). The X-axis direction and the Y-axis direction are orthogonal to each other in a plane (horizontal plane) perpendicular to the Z-axis.

Embodiment

Configuration of Electricity Storage System

An electricity storage system according to an embodiment will be described with reference to FIG. 1 and FIG. 2.

Figure 1:
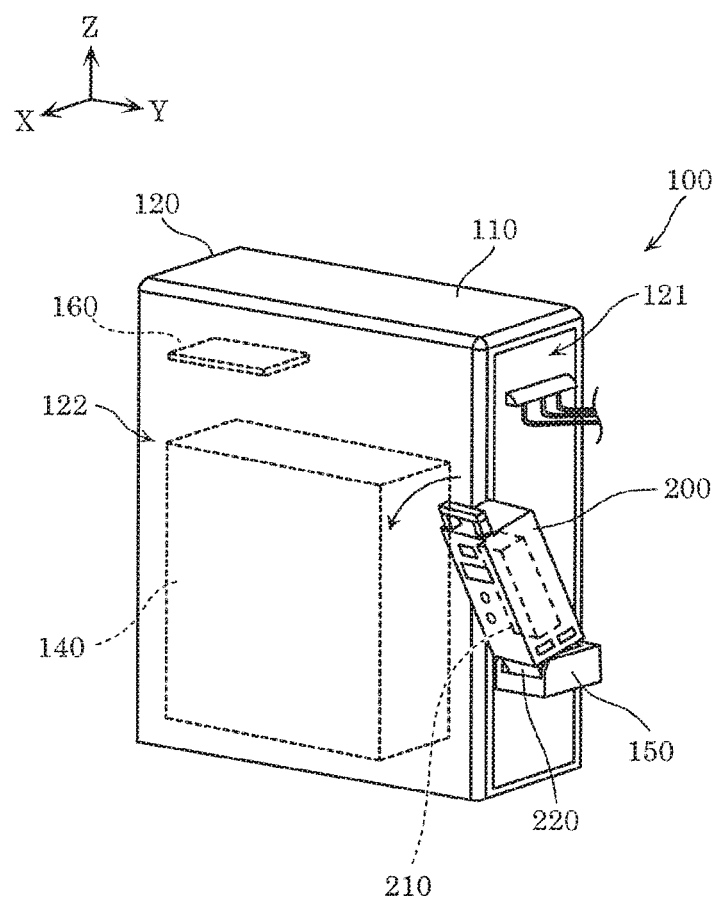
FIG. 1 is an external perspective view of an electricity storage system according to an embodiment.

FIG. 1 is an external perspective view of the electricity storage system according to the embodiment. FIG. 2 is a block diagram illustrating the characteristic function and configuration of the electricity storage system according to the embodiment.

Figure 2:
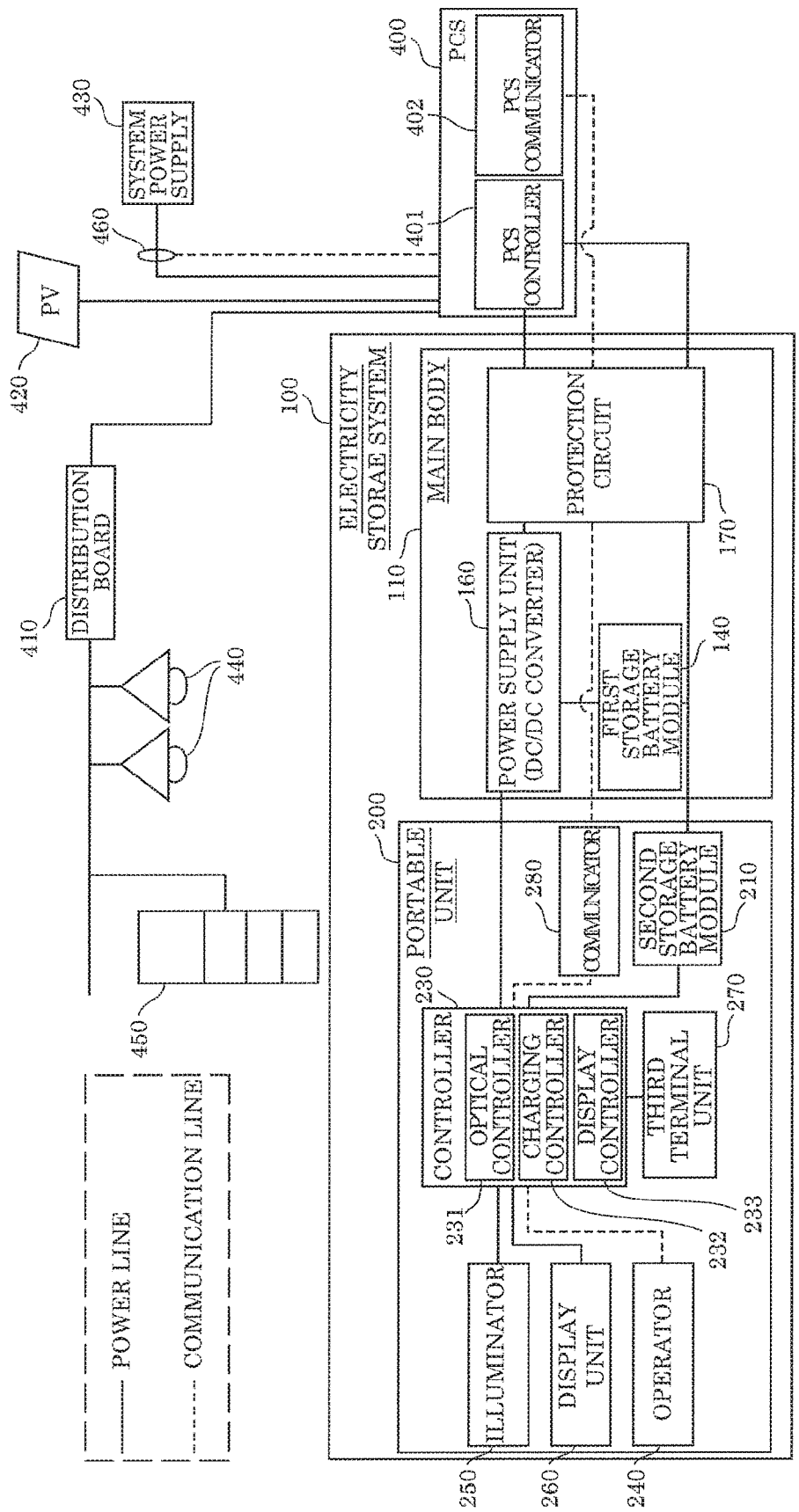
FIG. 2 is a block diagram illustrating the characteristic function and configuration of an electricity storage system according to an embodiment.

As illustrated in FIG. 1 and FIG. 2, electricity storage system 100 is an electricity storage system (electricity storage device) which is connected to power conditioner (PCS) 400 connected to system power supply 430. Electricity storage system 100 includes main body 110 and portable unit 200.

Main body 110 is an electricity storage device connected to PCS 400 and used for storing electricity (charging) by receiving power via PCS 400 from PV 420, which is photovoltaics (PV), and/or system power supply 430. Main body 110 charges one or more first storage battery modules 140 included in main body 110 with the power received via PCS 400. Main body 110 functions as a battery that supplies power stored in first storage battery module 140 to loading devices such as lighting device 440 and refrigerator 450 via distribution board 410 in times of emergency such as when power supply (electric power transmission) from system power supply 430 which is an external utility power supply is stopped (when what is called a power failure occurs), for example, in the event of a disaster. In other words, electricity storage system 100 is an emergency electricity storage system capable of supplying power in times of emergency.

Portable unit 200 is attachable to and detachable from main body 110 and includes second storage battery module 210 having a storage capacity (the initial value of capacity for power storage when fully charged) less than that of first electricity storage battery module 140. Portable unit 200 functions as a battery that is carried by a user and used for charging a desired device in a desired location, for example, in the event of a disaster.

Main body 110 includes casing 120, power supply unit (DC/DC converter) 160, protection circuit 170, first storage battery module 140, and first terminal unit 150.

Casing 120 is a container which encloses first storage battery module 140. The material of casing 120 is, for example, a metal material. In the present embodiment, the shape of casing 120 is the form of a cuboid elongated in the Z-axis direction with a top surface, a bottom surface, and side surfaces. The side surfaces include side surface (second side surface) 122 having the largest area in plan view and side surface (first side surface) 121 having a smaller area in plan view than second side surface 122. In other words, among the side surfaces of casing 120, first side surface 121 is smaller in area than second side surface 122 having the largest area. In the present embodiment, first side surface 121 is located in a direction intersecting second side surface 122. In this description, the side surface of casing 120 means a surface of casing 120 other than the top surface which is a surface in the positive direction of the Z-axis and the bottom surface which is a surface in the negative direction of the Z-axis.

Power supply unit 160 is a DC/DC converter for adjusting the voltage of power supplied from system power supply 430 or the like to first storage battery module 140 via PCS 400. Alternatively, power supply unit 160 adjusts the voltage of power to be supplied from first storage battery module 140 to a loading device such as lighting device 440 via PCS 400. Power supply unit 160 easily produces heat when supplied with power. Therefore, in order to reduce the effect the heat from power supply unit 160 has on first storage battery module 140 and second storage battery module 210, power supply unit 160 may be disposed above at least one of first storage battery module 140 and second storage battery module 210. In order to reduce the effect the heat from power supply unit 160 has on first storage battery module 140 and second storage battery module 210, power supply unit 160 may desirably be disposed above first storage battery module 140 and second storage battery module 210.

Protection circuit 170 is for preventing over discharging and over charging of first storage battery module 140. For example, when power is supplied from system power supply 430 or the like to first storage battery module 140 via PCS 400, protection circuit 170 performs control such that first storage battery module 140 is not over discharged or over charged. Alternatively, when power is supplied from first storage battery module 140 to a loading device such as refrigerator 450, protection circuit 170 performs control such that first storage battery module 140 is not over discharged.

First storage battery module 140 is a storage battery module for storing power supplied from PV 420, system power supply 430, or the like via PCS 400. Although first storage battery module 140 is not particularly limited, a lithium-ion battery, a lead-acid battery, or the like is used, for example, as a storage battery of the type in which the cycle operation usage is emphasized.

Furthermore, first storage battery module 140 supplies, to second storage battery module 210 included in portable unit 200, power to be stored in second storage battery module 210.

Specifically, first storage battery module 140 supplies power to be stored in second storage battery module 210 included in portable unit 200 via first terminal 151 (refer to FIG. 3) included in first terminal unit 150 to which portable unit 200 is detachably attached and second terminal 221 (refer to FIG. 5) which is electrically connected to first terminal 151. More specifically, when power is being supplied from system power supply 430 or the like, PCS controller 401 included in PCS 400 causes the power supplied from system power supply 430 or the like or the power stored in first storage battery module 140 to be supplied to second storage battery module 210. Furthermore, when no power is being supplied from system power supply 430, controller 230 (specifically, charging controller 232)

included in portable unit 200 causes the power stored in first storage battery module 140 to be supplied to second storage battery module 210.

PCS 400 is a power conditioner that supplies, to electricity storage system 100, power supplied from system power supply 430. PCS 400 includes PCS controller 401 and PCS communicator 402.

PCS controller 401 is a control device that controls the supply, to electricity storage system 100, of power supplied from system power supply 430. PCS controller 401 is implemented, for example, with a central processing unit (CPU) and a control program stored in a storage device (not illustrated in the drawings) including read-only memory (ROM), random-access memory (RAM), a hard disk drive (HDD), flash memory, or the like.

PCS communicator 402 is a communication interface for allowing PCS 400 and electricity storage system 100 (specifically, communicator 280 included in portable unit 200) to communicate with each other.

First terminal unit 150 is a connecting component that is detachably connected to portable unit 200. First terminal unit 150 is detachably connected to portable unit 200.

PCS 400 further includes sensor 460 for detecting that the power supply from system power supply 430 has been stopped.

Sensor 460 is a power failure detector (for example, an electric current sensor) for detecting whether or not a power line electrically connecting system power supply 430 and PCS 400 is supplied with power (that is, whether or not there is a power failure). When sensor 460 detects that the power supply from system power supply 430 has been stopped, PCS controller 401 transmits, via PCS communicator 402, a signal indicating that the power supply from system power supply 430 has been stopped, to portable unit 200 connected to PCS 400 through a communication line.

Portable unit 200 is an electricity storage device that is attachable to and detachable from main body 110 and includes one or more second storage battery modules 210. Portable unit 200 is located on the side of a side surface of casing 120 of main body 110. Specifically, first terminal unit 150 to which portable unit 200 is electrically connected is located on the side of the side surface of casing 120. In this description, the side of the side surface of casing 120 means a region including inner and outer areas of casing 120 near the side surface thereof. In the present embodiment, first terminal unit 150 is located on the side of first side surface 121 among the side surfaces of casing 120. Specifically, in the present embodiment, first terminal unit 150 is attached to first side surface 121 outside casing 120. Although portable unit 200 is not limited to a particular shape, the shape of portable unit 200 in the present embodiment is a cuboid elongated in the Z-axis direction when portable unit 200 is attached to first terminal unit 150. Second terminal unit 220 is disposed on the bottom surface of portable unit 200, and portable unit 200 is positioned above first terminal unit 150. In other words, portable unit 200 is placed on first terminal unit 150, resulting in first terminal unit 150 and second terminal unit 220 being electrically connected.

Portable unit 200 includes second storage battery module 210, second terminal unit 220, controller 230, operator (button) 240, illuminator 250, display unit 260, third terminal unit 270, and communicator 280.

Second storage battery module 210 is a storage battery module for storing power supplied from PV 420, system power supply 430, or first storage battery module 140. Although second storage battery module 210 is not particularly limited, a lithium-ion battery, a lead-acid battery, or the like is used, for example, as a storage battery of the type in which the standby usage is emphasized. A high-capacity storage battery supporting fast charging, for example, may be used as second storage battery module 210.

The storage capacity of second storage battery module 210 is set less than that of first storage battery module 140. Specifically, second storage battery module 210 is set to have less volume and less weight than first storage battery module 140. For example, in order to allow a user to easily carry portable unit 200, the type of the storage battery may be used for second storage battery module 210 be selected so that portable unit 200 weighs 10 kg or less. The type of the storage battery to be used for second storage battery module 210 may desirably be selected so that portable unit 200 weighs 5 kg or less.

First storage battery module 140 is used as a battery for electrical appliances that consume large amounts of power, such as lighting device 440 and refrigerator 450, in times of emergency such as when a disaster or the like occurs. For example, first storage battery module 140 functions as a battery to be used during a cycle operation that is performed once a day or in the event of a power failure or the like in which no power is supplied from system power supply 430. Therefore, the storage battery to be used for first storage battery module 140 may have high resistance to deterioration due to the cycle operation (long cycle life) and high resistance to time degradation (long storage life).

Second storage battery module 210 functions as a battery for charging external device 300 (refer to FIG. 6) that consumes a relatively small amount of power such as an emergency light source including a flashlight or a smartphone, etc. Second storage battery module 210 is a portable battery and when connected to first terminal unit 150, is supplied with power from system power supply 430 or first storage battery module 140 so as to remain fully charged.

Furthermore, as described above, second storage battery module 210 supplies power to external device 300 such as a smartphone. Therefore, the storage battery to be used for second storage battery module 210 may have high resistance to time degradation (long storage life). In addition, a storage battery having high energy density and capable of fast charging may be selected for second storage battery module 210 because it is expected that portable unit 200 will be hastily detached from main body 110 and carried by a user in times of emergency such as when there is a power failure.

Accordingly, a storage battery having a large storage capacity may be used for first storage battery module 140, compared to second storage battery module 210, and a small, lightweight storage battery may be used for second storage battery module 210, compared to first storage battery module 140.

It is sufficient that second storage battery module 210 have a storage capacity less than that of first storage battery module 140; the material of the storage battery used for first storage battery module 140 and the material of the storage battery used for second storage battery module 210 may be the same or different. For example, storage batteries having different sizes may be used for first storage battery module 140 and second storage battery module 210 so that second storage battery module 210 has a storage capacity less than that of first storage battery module 140. Alternatively, first storage battery module 140 installed on main body 110 and second storage battery module 210 may be different in number so that second storage battery module 210 has a storage capacity less than that of first storage battery module 140.

Second terminal unit 220 is a connecting component that is detachably connected to first terminal unit 150 of main body 110. When portable unit 200 is attached to first terminal unit 150, second terminal 221 included in second terminal unit 220 and first terminal 151 included in first terminal unit 150 are electrically connected.

Controller 230 is a control device that controls operator 240, illuminator 250, and display unit 260 included in portable unit 200. Controller 230 is implemented, for example, with a CPU and a control program stored in a storage device (not illustrated in the drawings) including ROM, RAM, a HDD, flash memory, or the like. Controller 230 functionally includes optical controller 231, charging controller 232, and display controller 233.

Optical controller 231 controls switching ON of illuminator 250. Specifically, optical controller 231 causes illuminator 250 to switch ON when operator 240 obtains an instruction for switching ON illuminator 250 from a user and when stoppage of the power supply from system power supply 430 to first storage battery module 140 is detected. More specifically, when optical controller 231 obtains a signal indicating that the power supply from system power supply 430 has been stopped from PCS 400 via communicator 280, optical controller 231 causes illuminator 250 to switch ON.

Charging controller 232 performs control to switch the charging rate (charging speed) for second storage battery module 210 between a normal mode in which the charging rate is equal to the charging rate for first storage battery module 140 and a high-speed mode in which the charging rate is greater than in the normal mode. For example, the possibility that a user will use portable unit 200 is expected to rise in times of emergency when a disaster or the like occurs. Therefore, charging controller 232 increases the charging rate for second storage battery module 210 when the power supply from system power supply 430 has been stopped. In other words, charging controller 232 performs control such that second storage battery module 210 is quickly charged. For example, charging controller 232 performs control to switch the charging rate when stoppage of the power supply from system power supply 430 to first storage battery module 140 is detected or when operator 240 obtains an instruction for changing the charging rate from a user of electricity storage system 100.

Display controller 233 controls the display mode of display unit 260. Specifically, display controller 233 sets display unit 260 to a first display mode when main body 110 and portable unit 200 are determined as operating normally, and sets display unit 260 to a second display mode different from the first display mode when at least one of main body 110 and portable unit 200 is determined as operating abnormally. Note that operating abnormally means, for example, a malfunction of main body 110 or portable unit 200 such as the failure to charge first storage battery module 140 or second storage battery module 210. In other words, display controller 233 controls display unit 260 in order to allow a user to easily intuitively recognize whether or not main body 110 or portable unit 200 is malfunctioning.

Note that optical controller 231, charging controller 232, and display controller 233 included in controller 230 may be provided as one control device or may be provided as more than one control device.

Operator (button) 240 is a button that is operated by a user and obtains an instruction from a user. For example, a user electrically connects portable unit 200 and external device 300 using cable 310 (refer to FIG. 6). Subsequently, when pressing of button 240 by a user is detected (that is, when operator 240 obtains an instruction from a user), charging controller 232 performs control to start the power supply from second storage battery module 210 to external device 300 (that is, charging of external device 300). Furthermore, for example, when pressing of button 240 by a user is detected, optical controller 231 causes illuminator 250 to switch ON. Note that portable unit 200 may include two or more buttons 240 that correspond to the above-described control of charging controller 232 and optical controller 231. Alternatively, portable unit 200 may include one button 240, and the number of times a user has pressed button 240 may be detected to allow charging controller 232 or optical controller 231 to perform the above-described control according to the detected number of times.

Illuminator 250 is a light-emitter that emits light according to a predetermined state. The predetermined state is, for example a case in which stoppage of the power supply from system power supply 430 to first storage battery module 140 has been detected or a state in which operator 240 has obtained an instruction for switching ON illuminator 250 from a user. Illuminator 250 includes a light source such as a light-emitting diode (LED), for example.

Display unit 260 is a display device for displaying the state of electricity storage system 100 (specifically, the state of main body 110 and portable unit 200). Display unit 260 includes a light source such as an LED or includes a display, for example. In the present embodiment, display unit 260 includes two light sources. Display controller 233 controls the number of light sources to switch ON so that information indicating the state of main body 110 and portable unit 200, that is, whether or not main body 110 and portable unit 200 have a malfunction, is presented to a user, for example. Note that the number, color, etc., of light sources to be used for display unit 260 are not particularly limited. Display unit 260 may include two or more light sources that emit light of different colors, for example.

Display controller 233 causes display unit 260 to switch ON and emit green light as the first display mode, for example, when main body 110 is operating normally. Furthermore, display controller 233 causes display unit 260 to switch ON and emit red light as the second display mode, for example, when main body 110 is operating abnormally.

Note that display controller 233 may display the state of main body 110 or portable unit 200 other than the normally operating state and the abnormally operating state thereof. For example, when controller 230 performs control to examine whether or not the devices, components, etc., included in main body 110 have a malfunction, display controller 233 may cause display unit 260 to emit yellow light and blink more slowly than in the second display mode.

Furthermore, display controller 233 may cause display unit 260 to display the current amount of power stored in second storage battery module 210, for example, when main body 110 and portable unit 200 are operating normally. For example, display unit 260 may include two light sources, and display controller 233 may cause the two light sources to switch ON when second storage battery module 210 is fully charged, and switch ON one of the two light sources when second storage battery module 210 is not fully charged.

Note that the function of illuminator 250 and the function of display unit 260 may be integrally provided, for example, as a light emitter such as a light source. In other words, this light emitter may have the function of illuminator 250 and the function of display unit 260.

Operator 240 does not need to be a button that operates when pressed by a user. For example, the function of operator 240 and the function of display unit 260 may be integrally provided using a touch panel display or the like. In other words, this touch panel display may have the function of operator 240 and the function of display unit 260.

Figure 6:
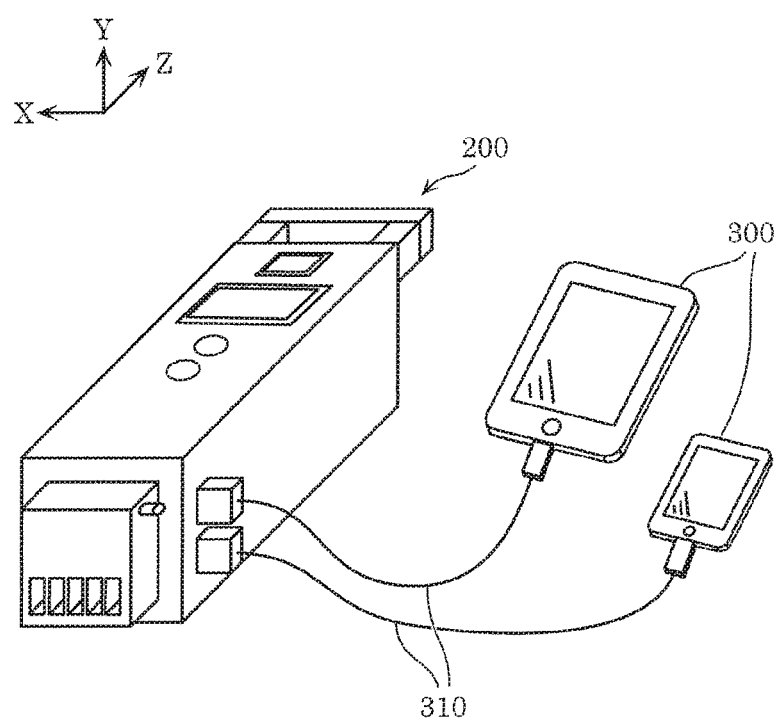
FIG. 6 illustrates the state in which a portable unit included in an electricity storage system according to an embodiment and an external device are connected.

Third terminal unit 270 is a terminal for electrically connecting portable unit 200 and external device 300 (refer to FIG. 6). Specifically, third terminal unit 270 is a terminal that is used to supply power stored in second storage battery module 210 to external device 300 and is electrically connectable to external device 300. Third terminal unit 270 is, for example, a universal serial bus (USB) connecting terminal and is electrically connected to external device 300 via cable 310 (refer to FIG. 6).

Communicator 280 is a communication interface for allowing portable unit 200 to communicate with PCS 400.

Next, the detailed structure of portable unit 200 included in electricity storage system 100 according to the embodiment will be described with reference to FIG. 3 to FIG. 8.

Figure 3:
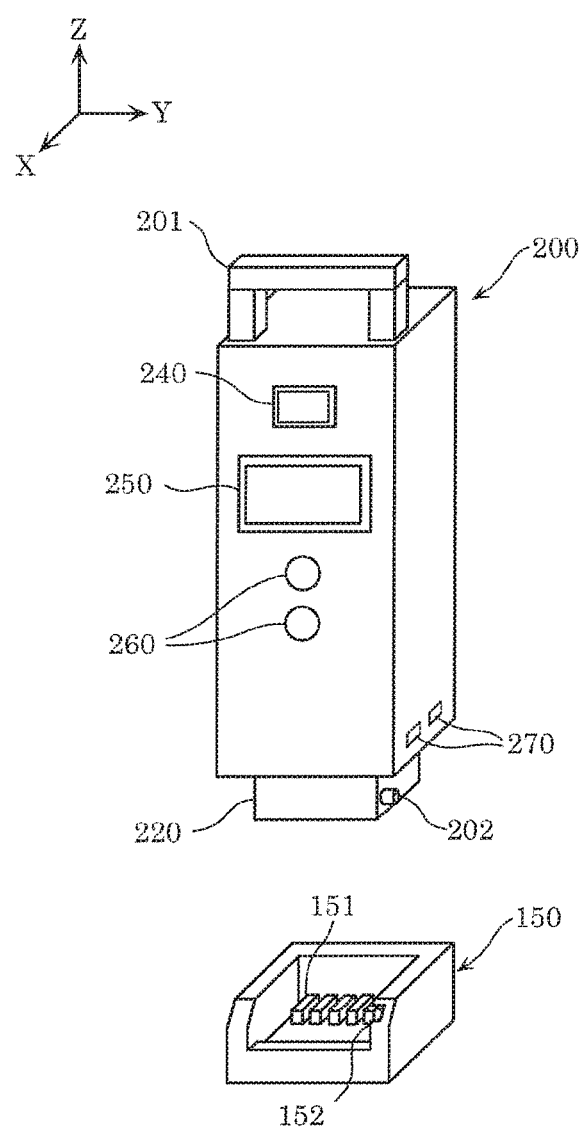
FIG. 3 is an external view of a portable unit and a first terminal unit included in an electricity storage system according to an embodiment when viewed from the front.
Figure 4:
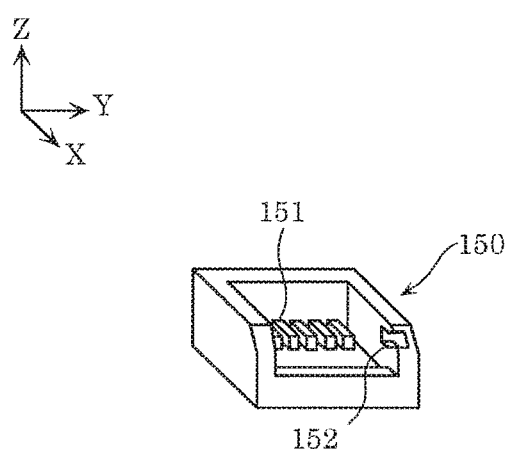
FIG. 4 is an external view of a first terminal unit included in an electricity storage system according to an embodiment when viewed from the front.
Figure 5:
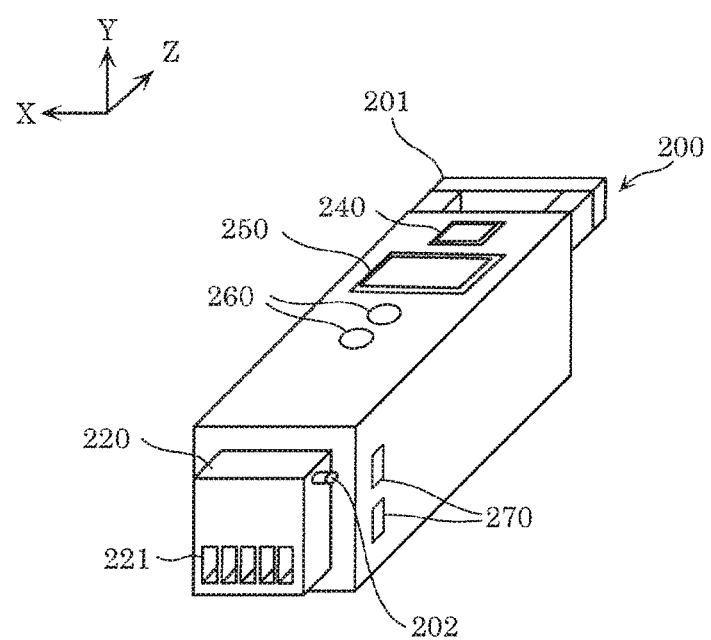
FIG. 5 is an external view of a portable unit included in an electricity storage system according to an embodiment when viewed from the bottom.
Figure 7:
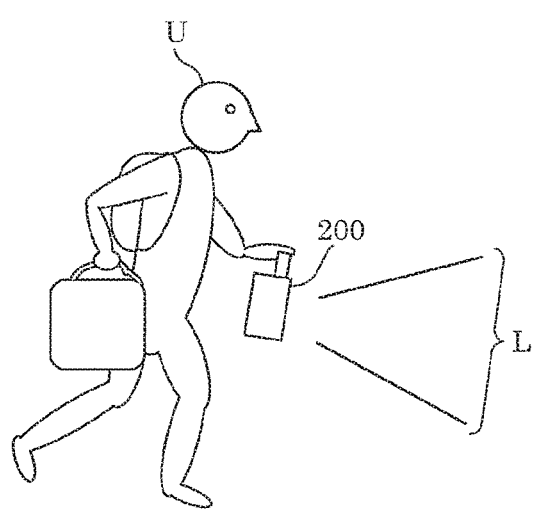
FIG. 7 illustrates the state in which a portable unit included in an electricity storage system according to an embodiment is detached from a main body by a user.

FIG. 3 is an external view of portable unit 200 and first terminal unit 150 included in electricity storage system 100 according to the embodiment when viewed from the front. FIG. 4 is an external view of first terminal unit 150 included in electricity storage system 100 according to the embodiment when viewed from the front. Specifically, FIG. 4 is an external view of first terminal unit 150 when viewed at an angle different from that in FIG. 3. FIG. 5 is an external view of portable unit 200 included in electricity storage system 100 according to the embodiment when viewed from the bottom. FIG. 6 illustrates the state in which portable unit 200 included in electricity storage system 100 according to an embodiment and external device 300 are connected. FIG. 7 illustrates the state in which portable unit 200 included in electricity storage system 100 according to the embodiment is detached from main body 110 by a user.

As illustrated in FIG. 3 to FIG. 5, portable unit 200 includes grip 201, second terminal unit 220, and third terminal unit 270.

Grip 201 is a handle to grab when a user detaches portable unit 200 from main body 110 and carries portable unit 200 to a desired location. Grip 201 is attached to the top surface (a surface in the positive direction of the Z-axis when portable unit 200 is attached to main body 110) of portable unit 200.

As illustrated in FIG. 7, user U detaches portable unit 200 from main body 110, for example, when there is a power failure. As described above, optical controller 231 causes illuminator 250 to switch ON when operator 240 obtains an instruction for switching ON illuminator 250 from a user or when stoppage of the power supply from system power supply 430 to first storage battery module 140 is detected. Accordingly, even when there is a power failure, illuminator 250 switches ON and emits light L; thus, user U can easily locate portable unit 200 and use portable unit 200 as an emergency light source.

Second terminal unit 220 is a terminal unit that is electrically connected to first terminal 151 included in first terminal unit 150 when portable unit 200 is attached to main body 110 (specifically, first terminal unit 150). Specifically, when portable unit 200 is attached to first terminal unit 150, first terminal 151 and second terminal 221 included in second terminal unit 220 are electrically connected.

As described above, third terminal unit 270 is a terminal for electrically connecting portable unit 200 and external device 300.

As illustrated in FIG. 6, third terminal unit 270 is, for example, an USB connecting terminal, and is electrically connected to external device 300 via cable 310. Charging controller 232 causes the power stored in second storage battery module 210 to be supplied to external device 300. In other words, charging controller 232 performs control to charge external device 300 using second storage battery module 210.

Furthermore, protrusion 202 is formed on a side surface of second terminal unit 220.

Protrusion 202 is a restricting part for allowing portable unit 200 to be attached to or detached from first terminal unit 150 only in a predetermined direction. The position of portable unit 200 is restricted by protrusion 202 and groove 152 formed in first terminal unit 150 when portable unit 200 is attached to or detached from first terminal unit 150. A user detaches portable unit 200 from first terminal unit 150 by rotating grip 201 with the first terminal unit 150-end part as an axis. This means that in order to detach portable unit 200 from first terminal unit 150, portable unit 200 needs to be rotated in the predetermined direction; thus, unintended detachment of portable unit 200 from first terminal unit 150 rarely occurs even when an earthquake or the like occurs, for example.

Figure 8:
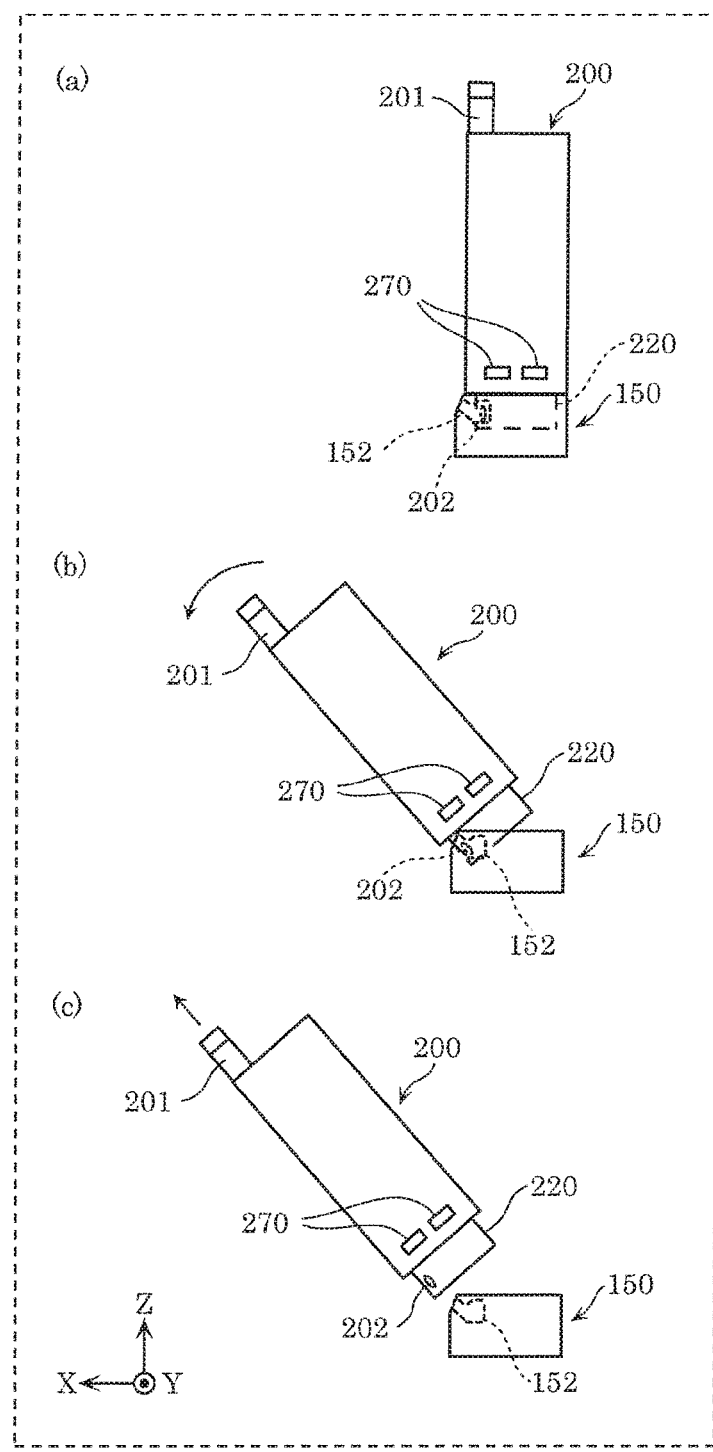
FIG. 8 illustrates movement of a portable unit included in an electricity storage system according to an embodiment when the portable unit is being detached from a first terminal unit.

FIG. 8 illustrates movement of portable unit 200 included in electricity storage system 100 according to the embodiment when portable unit 200 is being detached from first terminal unit 150. Specifically, FIG. 8 illustrates how to move portable unit 200 when a user detaches portable unit 200 from first terminal unit 150. More specifically, (a) in FIG. 8 illustrates the state in which portable unit 200 is attached to first terminal unit 150, (b) in FIG. 8 illustrates the state in which portable unit 200 is in the process of being detached from first terminal unit 150 and protrusion 202 is fitted in groove 152, and (c) in FIG. 8 illustrates the state in which portable unit 200 is detached from first terminal unit 150.

As illustrated in (a) in FIG. 8, protrusion 202 is located in the space defined by groove 152. In other words, protrusion 202 is fitted in groove 152. Groove 152 is formed in the inner surface of first terminal unit 150 so as to extend diagonally downward from a lateral end of first terminal unit 150 in the positive direction of the X-axis. This means that in the state in which protrusion 202 and groove 152 are fitted, portable unit 200 cannot be detached upward (in the positive direction of the Z-axis) because of protrusion 202 and groove 152. Thus, portable unit 200 is configured in such a way that unintended detachment thereof from first terminal unit 150 is not likely to occur due to vibrations caused by an earthquake or the like.

As illustrated in (b) in FIG. 8, when portable unit 200 is to be detached from first terminal unit 150, a user rotates portable unit 200 about the first terminal unit 150-end part as a pivot. For example, a user rotates grip 201 in the direction of the arrow indicated in (b) in FIG. 8. When protrusion 202 is viewed in a direction perpendicular to the XZ plane, protrusion 202 has an elliptical shape elongated in the longitudinal direction of portable unit 200. When portable unit 200 is rotated, the longitudinal direction of protrusion 202 changes in orientation relative to the direction in which groove 152 extends. Thus, rotation of portable unit 200 allows protrusion 202 to move along groove 152.

As illustrated in (c) in FIG. 8, when a user moves portable unit 200 in the direction of the arrow indicated in (c) in FIG. 8, portable unit 200 can be detached from first terminal unit 150.

As described above, portable unit 200 is configured to be attachable to and detachable from first terminal unit 150 by being rotated about a rotation axis extending in a direction intersecting first side surface 121.

Next, a specific operation of optical controller 231 will be described with reference to FIG. 9.

Figure 9:
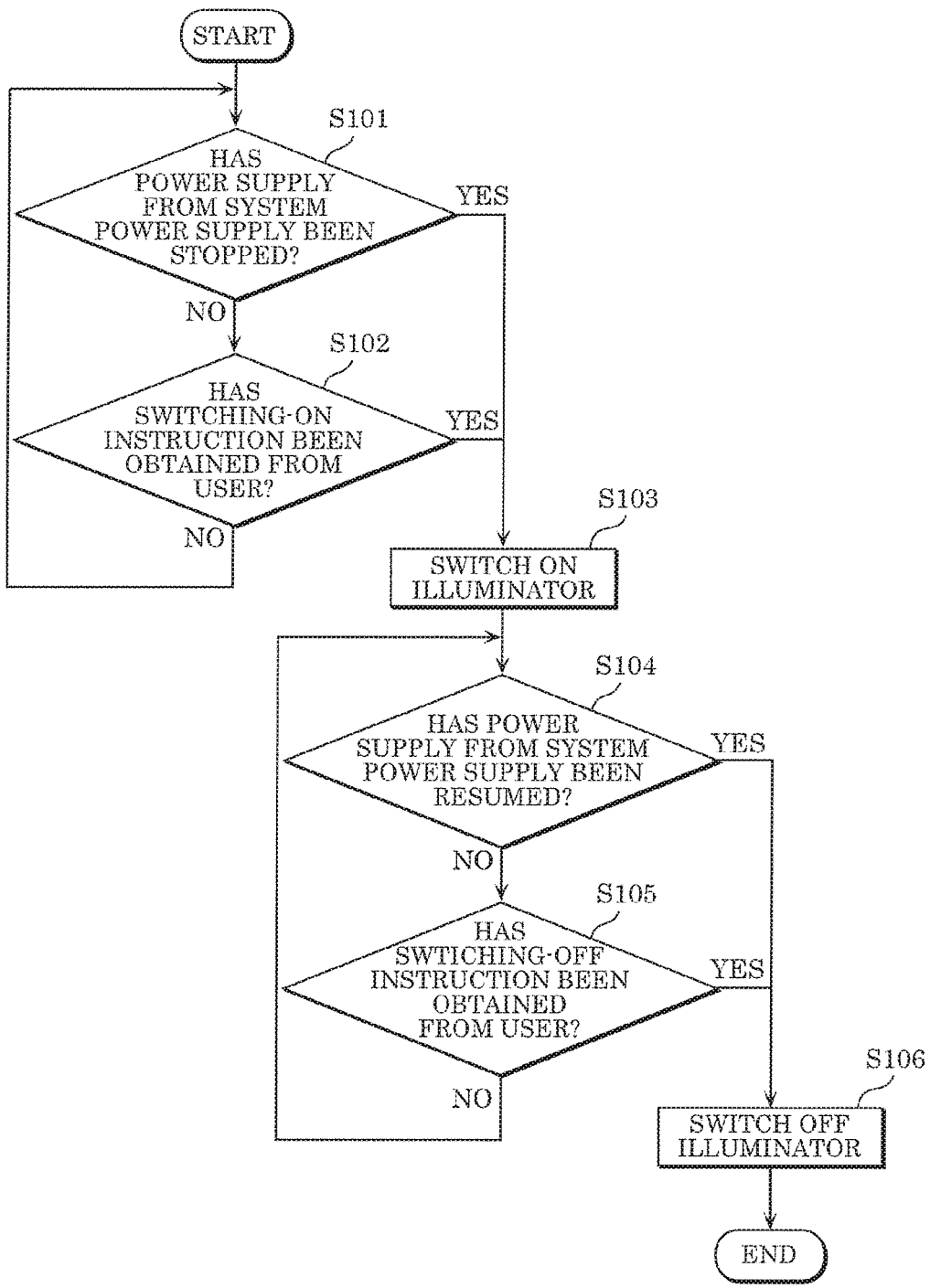
FIG. 9 is a flowchart illustrating the operational sequence performed when an optical controller included in an electricity storage system according to an embodiment controls an illuminator.

FIG. 9 is a flowchart illustrating the operational sequence performed when optical controller 231 included in electricity storage system 100 according to the embodiment controls illuminator 250.

For example, when a power failure occurs in the event of a disaster and sensor 460 detects that the power supply from system power supply 430 has been interrupted, portable unit 200 functions as an emergency light source such as a flashlight. Specifically, optical controller 231 causes illuminator 250 to switch ON when the power supply from system power supply 430 has been stopped.

As illustrated in FIG. 9, optical controller 231 determines whether or not the power supply from system power supply 430 has been stopped (Step S101). Specifically, in Step S101, optical controller 231 determines whether or not a signal indicating that the power supply from system power supply 430 has been interrupted has been obtained from sensor 460 (more specifically, PCS controller 401) via communicator 280.

Furthermore, when optical controller 231 determines that the power supply from system power supply 430 has not been stopped (NO in Step S101), optical controller 231 determines whether or not a switching-ON instruction has been obtained from a user (Step S102). Specifically, in Step S102, optical controller 231 determines whether or not operator 240 has obtained an instruction for switching ON illuminator 250 from a user.

Optical controller 231 repeats the operations performed in Step S101 and Step S102 when the instruction for switching ON illuminator 250 has not been obtained from a user (NO in Step S102).

On the other hand, when optical controller 231 determines that the power supply from system power supply 430 has been stopped (YES in Step S101) or the switching-ON instruction has been obtained from a user (YES in Step S102), optical controller 231 causes illuminator 250 to switch ON (Step S103).

Next, optical controller 231 determines whether or not the power supply from system power supply 430 has been resumed (Step S104).

Furthermore, when optical controller 231 determines that the power supply from system power supply 430 has not been resumed (NO in Step S104) or when power is being supplied from system power supply 430 (YES in Step S101) and as a result of obtaining the switching-ON instruction from a user (YES in Step S102), illuminator 250 has switched ON, optical controller 231 determines whether or not a switching-OFF instruction has been obtained from a user (Step S105). Specifically, in Step S105, optical controller 231 determines whether or not operator 240 has obtained an instruction for switching OFF illuminator 250 from a user.

Optical controller 231 repeats the operations performed in Step S104 and Step S105 when the instruction for switching OFF illuminator 250 has not been obtained from a user (NO in Step S105).

On the other hand, when optical controller 231 determines that the power supply from system power supply 430 has been resumed (YES in Step S104) or when the switching-OFF instruction has been obtained from a user (YES in Step S105), optical controller 231 switches OFF illuminator 250 (Step S106).

Next, a specific operation of charging controller 232 will be described with reference to FIG. 10.

Figure 10:
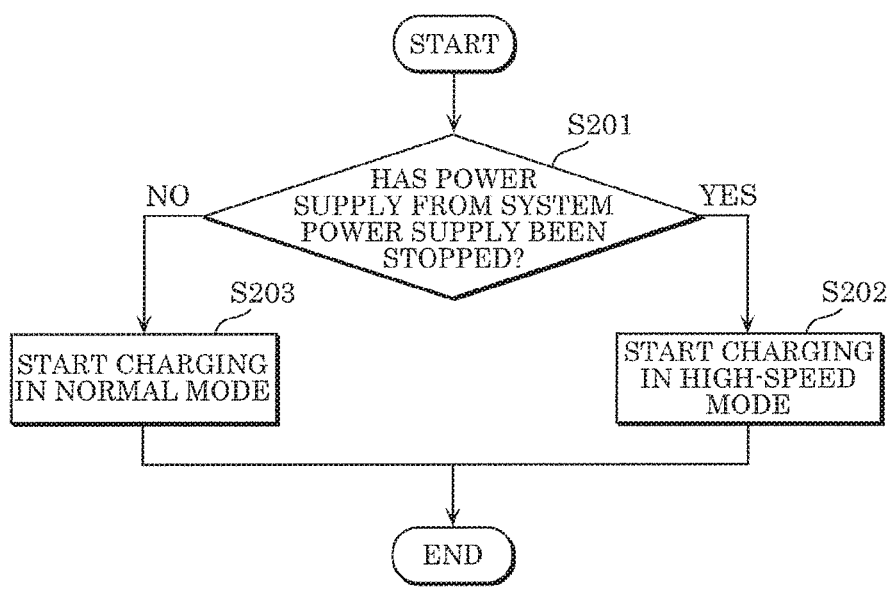
FIG. 10 is a flowchart illustrating the operational sequence performed when a charging controller included in an electricity storage system according to an embodiment changes the charging mode of a second storage battery module.

FIG. 10 is a flowchart illustrating the operational sequence performed when charging controller 232 included in electricity storage system 100 according to the embodiment changes the charging mode of second storage battery module 210.

Charging controller 232 causes the power supplied from system power supply 430 to be supplied to first storage battery module 140 so that first storage battery module 140 is charged. Furthermore, charging controller 232 causes the power supplied from system power supply 430 to be supplied to second storage battery module 210 so that second storage battery module 210 is charged.

The charging speed, that is, the charging rate, for charging first storage battery module 140 and second storage battery module 210 is predetermined, and charging controller 232 performs control such that second storage battery module 210 is charged in the normal mode in which the charging rate is the predetermined charging rate.

For example, when sensor 460 detects that the power supply from system power supply 430 has been interrupted due to a power failure or the like in the event of a disaster, it is expected that portable unit 200 will be hastily detached from main body 110 and used by a user. In this case, portable unit 200 (specifically, second storage battery module 210 included in portable unit 200) needs to be quickly charged. Therefore, when interruption of the power supply from system power supply 430 is detected, charging controller 232 performs control such that second storage battery module 210 is charged in a high-speed mode in which the charging rate for second storage battery module 210 is greater than in the normal mode.

As illustrated in FIG. 10, charging controller 232 determines whether or not the power supply from system power supply 430 has been stopped (Step S201). Specifically, in Step S201, charging controller 232 determines whether or not sensor 460 has detected interruption of the power supply from system power supply 430 and a signal indicating the interruption of the power supply from system power supply 430 has been obtained from PCS controller 401 via communicator 280.

Charging controller 232 determines that the power supply from system power supply 430 has been stopped (YES in Step S201), charging controller 232 performs control such that second storage battery module 210 is charged in the high-speed mode (Step S202).

On the other hand, when charging controller 232 determines that the power supply from system power supply 430 has not been stopped (NO in Step S201), charging controller 232 performs control such that second storage battery module 210 is charged in the normal mode (Step S203).

Next, a specific operation of display controller 233 will be described with reference to FIG. 11.

Figure 11:
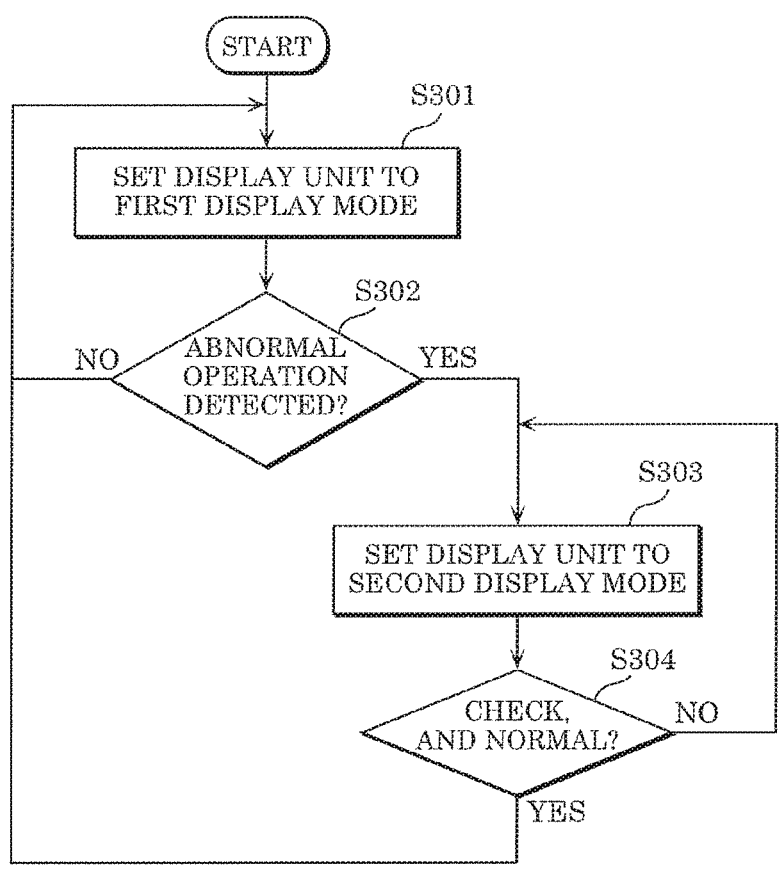
FIG. 11 is a flowchart illustrating the operational sequence performed when a display controller included in an electricity storage system according to an embodiment controls a display unit.

FIG. 11 is a flowchart illustrating the operational sequence performed when display controller 233 included in electricity storage system 100 according to the embodiment changes the display mode of display unit 260.

As described above, display controller 233 sets display unit 260 to the first display mode when main body 110 and portable unit 200 are determined as operating normally. Furthermore, display controller 233 sets display 260 to the second display mode different from the first display mode when at least one of main body 110 and portable unit 200 is determined as operating abnormally.

As illustrated in FIG. 11, when electricity storage system 100 is started, display controller 233 controls display unit 260 so that display unit 260 is placed in the first display mode (Step S301). For example, display controller 233 causes display unit 260 to switch ON and emit green light as the first display mode.

Next, display controller 233 determines whether or not an abnormal operation of main body 110 or portable unit 200 has been detected (Step S302). Specifically, in Step S302, display controller 233 detects whether or not the devices, components, etc., included in main body 110 or portable unit 200 have a malfunction.

When an abnormal operation of main body 110 or portable unit 200 has been detected (YES in Step S302), display controller 233 controls display unit 260 so that display unit 260 is placed in the second display mode (Step S303). For example, display controller 233 causes display unit 260 to switch ON and emit red light as the second display mode.

On the other hand, when no abnormal operation of main body 110 or portable unit 200 has been detected (NO in Step S302), display controller 233 continuously performs control to set display unit 260 to the first display mode and continues detection of an abnormal operation of main body 110 or portable unit 200.

Furthermore, next to Step S303, display controller 233 determines whether or not main body 110 and portable unit 200 have been restored to operate normally (Step S304). Specifically, in Step S304, display controller 233 checks the devices, components, etc., included in main body 110 and portable unit 200, and determines whether or not main body 110 and portable unit 200 are operating normally.

When main body 110 and portable unit 200 are determined as having been restored to operate normally (YES in Step S304), display controller 233 controls display unit 260 so that display unit 260 is placed in the first display mode (Step S301).

On the other hand, when display controller 233 determines that main body 110 or portable unit 200 is still operating abnormally and is determined as not having been restored (NO in Step S304), display controller 233 continues to control display unit 260 while display unit 260 is maintained in the second display mode (Step S303).

Display controller 233 continues to perform the above control in Step S301 to Step S304.

Variation 1 of Embodiment

Configuration of Electricity Storage System

Next, an electricity storage system according to Variation 1 of the embodiment will be described. Note that elements that are substantially the same as those in electricity storage system 100 according to the embodiment are assigned the same reference signs, and overlapping description may be omitted or simplified.

Figure 12:
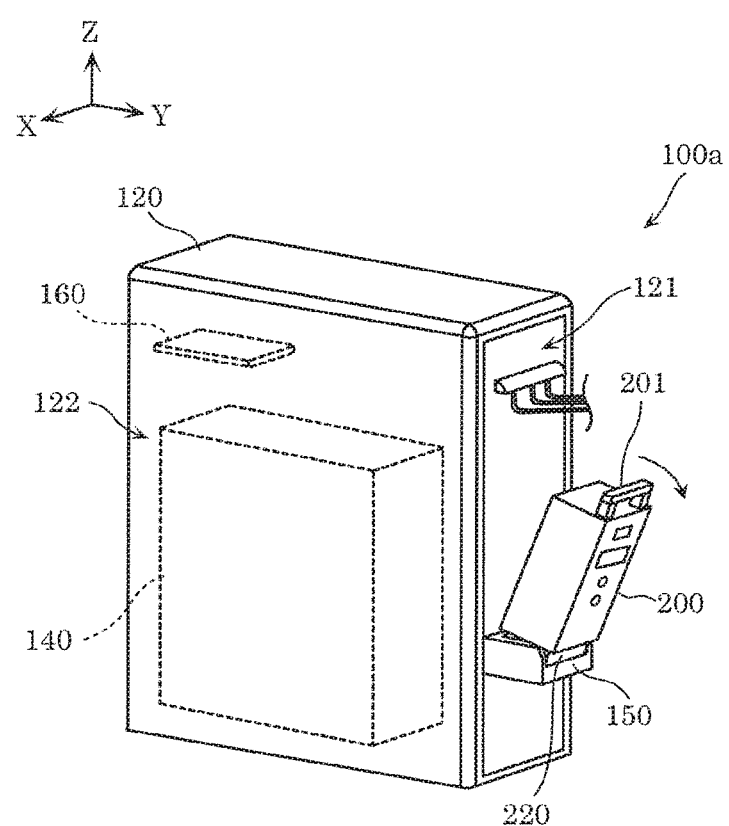
FIG. 12 is an external perspective view of an electricity storage system according to Variation 1 of an embodiment.

FIG. 12 is an external perspective view of an electricity storage system according to Variation 1 of the embodiment.

As illustrated in FIG. 12, in electricity storage system 100a, first terminal unit 150 is located on the side of a side surface of casing 120 as in the above-described embodiment. Specifically, in Variation 1, first terminal unit 150 is attached to first side surface 121 outside casing 120 as in the above-described embodiment. In electricity storage system 100a, first terminal unit 150 is configured in such a way as to allow a user to detach portable unit 200 from main body 110 (specifically, first terminal unit 150) by rotating grip 201 in a direction in the YZ plane. Specifically, in electricity storage system 100a, first terminal unit 150 is attached to first side surface 121 in such a way as to be oriented in a direction different from the orientation thereof in electricity storage system 100. Groove 152 is formed in the inner surface of first terminal unit 150 so as to extend diagonally downward from a lateral end of first terminal unit 150 in the positive direction of the Y-axis. In other words, in electricity storage system 100a, portable unit 200 is configured to be attachable to and detachable from first terminal unit 150 by being rotated about a rotation axis extending in a direction intersecting second side surface 122.

Electricity storage system 100 and electricity storage system 100a are assumed to be disposed, for example, in a gap between a refrigerator and a kitchen inside a house. Portable unit 200 is configured to be attachable to and detachable from first terminal unit 150 by being rotated about a rotation axis extending in a direction intersecting first side surface 121 or a direction intersecting second side surface 122. This allows effective use of the space in the location in which electricity storage system 100 or electricity storage system 100a is installed.

Variation 2 of Embodiment

Configuration of Electricity Storage System

Next, an electricity storage system according to Variation 2 of the embodiment will be described. Note that elements that are substantially the same as those in electricity storage system 100 according to the embodiment and electricity storage system 100a according to Variation 1 of the embodiment are assigned the same reference signs, and overlapping description may be omitted or simplified.

Figure 13:
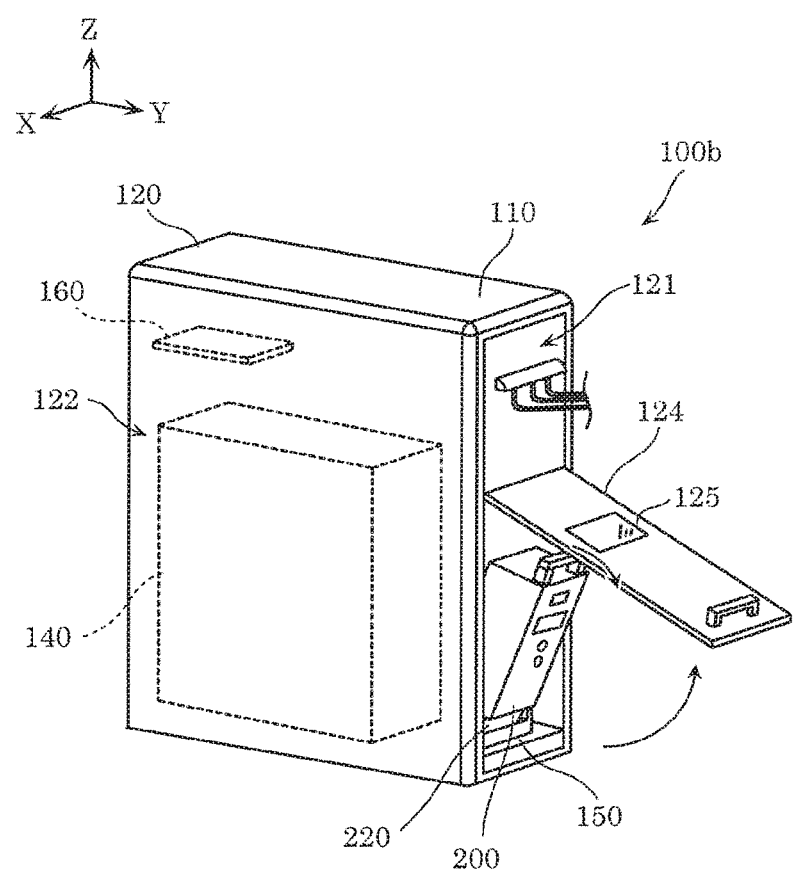
FIG. 13 is an external perspective view of an electricity storage system according to Variation 2 of an embodiment.

FIG. 13 is an external perspective view of an electricity storage system according to Variation 2 of the embodiment.

As illustrated in FIG. 13, in electricity storage system 100b, first terminal unit 150 to which portable unit 200 is electrically connected is located on the side of a side surface of casing 120 as in the above-described embodiment. As in electricity storage system 100a, first terminal unit 150 is configured in such a way as to allow a user to detach portable unit 200 from main body 110 (specifically, first terminal unit 150) by rotating grip 201 in a direction in the YZ plane. In other words, in electricity storage system 100b, first terminal unit 150 is attached to casing 120 in such a way as to be oriented in the same direction as electricity storage system 100a. In other words, in electricity storage system 100b, portable unit 200 is configured to be attachable to and detachable from first terminal unit 150 by being rotated about a rotation axis extending in a direction intersecting second side surface 122.

Unlike electricity storage system 100 and electricity storage system 100a, electricity storage system 100b includes portable unit 200 (specifically, first terminal unit 150 to which portable unit 200 is attached) attached to the inside of casing 120. Thus, first terminal unit 150 is located inside of casing 120. With this configuration, the occurrence of unintended detachment of portable unit 200 from first terminal unit 150 due to a user unintendedly touching portable unit 200 is reduced.

Note that as in electricity storage system 100b, when portable unit 200 is disposed inside of casing 120, openable door 124 may be provided on first side surface 121 of casing 120, for example. Upon detaching portable unit 200 from main body 110 to take out portable unit 200, a user opens door 124 and detaches portable unit 200 from main body 110 to carry portable unit 200.

Furthermore, as described above, when optical controller 231 determines that the power supply from system power supply 430 has been stopped, optical controller 231 causes illuminator 250 to switch ON. In order to allow a user to easily check the light emitted by illuminator 250 also when portable unit 200 is disposed inside of casing 120, window 125 through which the light emitted by illuminator 250 passes may be formed in door 124.

Advantageous Effects, Etc

Electricity storage system 100 according to the embodiment is connected to power conditioner (PCS) 400 connected to system power supply 430. Electricity storage system 100 includes main body 110 including: first storage battery module 140 that stores power supplied from PCS 400; casing 120 that encloses first storage battery module 140; and first terminal unit 150 that is used to supply the power. Electricity storage system 100 further includes portable unit 200 which is attachable to and detachable from first terminal unit 150 and includes: second terminal unit 220 which is electrically connectable to first terminal unit 150 and receives the power supplied from main body 110; and second storage battery module 210 which has a storage capacity less than that of first storage battery module 140 and is charged with the power supplied from main body 110 via second terminal unit 220. First terminal unit 150 is located on the side of a side surface of casing 120.

Such a configuration allows a user to detach portable unit 200 including second storage battery module 210 from main body 110 to carry portable unit 200. This means that a user can use, in a desired location, the storage battery module included in electricity storage system 100. Thus, electricity storage system 100 improves user convenience.

Furthermore, since it is expected that a user will take out and use portable unit 200, second storage battery module 210 has a storage capacity less than that of first storage battery module 140 from the perspective of portability. In other words, second storage battery module 210 is smaller and lighter than first storage battery module 140. With this, electricity storage system 100 improves user convenience. Furthermore, for example, when portable unit 200 is installed on an outer side surface of casing 120, the center of gravity of electricity storage system 100 is biased toward the location in which portable unit 200 is installed. When second storage battery module 210 is set lighter than first storage battery module 140, the center of gravity of electricity storage system 100 is less likely to be biased toward the location in which portable unit 200 is installed. Thus, electricity storage system 100 is less likely to fall over when electricity storage system 100 is installed on the floor.

Furthermore, portable unit 200 is located not in a central area inside casing 120, but on the side of a side surface of casing 120. This allows a user to easily detach portable unit 200 from casing 120. Thus, the convenience of electricity storage system 100 is improved.

First terminal unit 150 may be located on the side of first side surface 121 of casing 120. Among the side surfaces of casing 120, first side surface 121 may be smaller in area than second side surface 122 having the largest area.

With this configuration, for example, also when portable unit 200 is attached to the outside of casing 120, electricity storage system 100 can be easily installed in a narrow gap formed between an electrical appliance and a kitchen or the like in a house.

Furthermore, portable unit 200 may be configured to be attachable to and detachable from first terminal unit 150 by being rotated about a rotation axis extending in a direction intersecting first side surface 121. Moreover, portable unit 200 may be configured to be attachable to and detachable from first terminal unit 150 by being rotated about a rotation axis extending in a direction intersecting second side surface 122.

With such a configuration, portable unit 200 and main body 110 are not easily detached even when electricity storage systems 100, 100a, and 100b shake because of an earthquake or the like. Thus, with such a configuration, the occurrence of a malfunction, etc., due to portable unit 200 being unintendedly detached from main body 110 and dropping to the floor or the like is reduced.

Furthermore, portable unit 200 may include: illuminator 250; optical controller 231 which controls switching ON of illuminator 250; and operator 240 which obtains an instruction from a user. Optical controller 231 may switch ON illuminator 250 when operator 240 obtains an instruction for switching ON illuminator 250 from a user and when stoppage of the power supply from system power supply 430 to first storage battery module 140 is detected.

With such a configuration, for example, when the power supply from system power supply 430 is stopped (that is, a power failure occurs), illuminator 250 switches ON. Thus, even when a power failure occurs, a user can easily identify the position of portable unit 200. Furthermore, when a power failure occurs, a user can take out portable unit 200 to use it as a light source that illuminates the surrounding area of the user. Moreover, in the case where a user can arbitrarily switch ON illuminator 250 by operating operator 240, it is possible to switch illuminator 250 ON at a timing desired by the user and thus, the convenience of portable unit 200 is improved.

In addition, portable unit 200 may further include third terminal unit 270 that is used to supply power to external device 300 and is electrically connectable to external device 300.

With such a configuration, a user can take out portable unit 200 and charge external device 300 in a desired location. Thus, the convenience of portable unit 200 is improved.

In addition, portable unit 200 may further include a charging controller which performs control to switch the charging rate for second storage battery module 210 between a normal mode in which the charging rate is equal to the charging rate for first storage battery module 140 and a high-speed mode in which the charging rate is greater than in the normal mode.

For example, when a power failure occurs, portable unit 200 is highly likely to be detached from main body 110 and taken out by a user. With such a configuration, second storage battery module 210 can be quickly charged depending on its state, and thus a user can detach portable unit 200 from main body 110 earlier and use portable unit 200.

In addition, main body 110 may include power supply unit 160 for supplying the power stored in first storage battery module 140 to second storage battery module 210. Power supply unit 160 may be disposed above at least one of first storage battery module 140 and second storage battery module 210.

Power supply unit 160 easily produces heat when supplied with power. Such a configuration leads to a reduction in the effect the heat from power supply unit 160 has on first storage battery module 140 and second storage battery module 210.

In addition, portable unit 200 may further include display unit 260 and display controller 233 which controls the display mode of display unit 260. Display controller 233 may set display unit 260 to a first display mode when main body 110 and portable unit 200 are determined as operating normally, and set display 260 to a second display mode different from the first display mode when at least one of main body 110 and portable unit 200 is determined as operating abnormally.

Such a configuration makes a malfunction of main body 110 or portable unit 200 noticeable to users.

Other Embodiments

Although the electricity storage system according to the embodiment has been described above, the present disclosure is not limited to the above embodiment.

In the above embodiment, controller 230 is implemented in the form of software by a processor executing a program, but such implementation is non-limiting; controller 230 may be implemented in the form of hardware by a dedicated electronic circuit using a gate array, etc.

Furthermore, in the above embodiment, operator (button) 240, illuminator 250, and display unit 260 of portable unit 200 are provided on the same side surface of portable unit 200, but this is non-limiting; for example, each of them may be installed on a different side surface of portable unit 200. Third terminal unit 270 may be provided on the same side surface of portable unit 200 on which operator (button) 240, illuminator 250, and display unit 260 of portable unit 200 are provided.

Furthermore, second terminal unit 220 of portable unit 200 may be configured to be electrically connectable to an external device to charge the external device. In other words, when second terminal unit 220 and an external device are electrically connected, charging controller 232 may cause the power stored in second storage battery module 210 to be supplied to the external device.

Furthermore, when stoppage of the power supply from system power supply 430 to first storage battery module 140 is detected, charging controller 232 may cause the power stored in second storage battery module 210 to be supplied to first storage battery module 140.

Furthermore, in order to ensure that portable unit 200 and first terminal unit 150 are not easily detached, a mechanism for locking portable unit 200 and first terminal unit 150 may be formed on portable unit 200 and first terminal unit 150. For example, a recess may be formed on a side surface of second terminal unit 220 included in portable unit 200, and a cylindrical locking pin that can fit into the recess and can be driven may be provided on first terminal unit 150. For example, charging controller 232 may drive the locking pin so that the locking pin fits into the recess when second storage battery module 210 included portable unit 200 is being charged. Thus, portable unit 200 and first terminal unit 150 may be configured so as not to be able to be detached when second storage battery module 210 is being charged. With such a configuration, it is possible to reduce the occurrence of unintended detachment of portable unit 200 from first terminal unit 150 when second storage battery module 210 is being charged.

Aside from the above, forms obtained by various modifications to the above-described embodiments and variations that can be conceived by a person of skill in the art as well as forms realized by arbitrarily combining structural elements and functions in the embodiments which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An electricity storage system connected to a power conditioner connected to a system power supply, the electricity storage system comprising:
   a main body including a first storage battery module, a casing, and a first terminal unit, the first storage battery module storing power supplied from the power conditioner, the casing enclosing the first storage battery module, the first terminal unit being used to supply the power and being located outside the casing; and
   a portable unit including a second terminal unit and a second storage battery module, the second terminal unit being electrically connectable to the first terminal unit and receiving the power supplied from the main body, the second storage battery module having a storage capacity less than a storage capacity of the first storage battery module and being charged with the power supplied from the main body via the second terminal unit, the portable unit being attachable to and detachable from the first terminal unit and being located outside the casing,
   wherein the portable unit further includes a charging controller, upon determination of power supply from the system power supply has been stopped, the charging controller controls a charging rate for the second storage battery module to be charged at least one of a normal mode and a high-speed mode.

2. The electricity storage system according to claim 1, wherein the first terminal unit is located on a side of a first side surface of the casing, and
   among side surfaces of the casing, the first side surface is smaller in area than a second side surface having a largest area.

3. The electricity storage system according to claim 2, wherein the portable unit is configured to be attachable to and detachable from the first terminal unit by being rotated about a rotation axis extending in a direction intersecting the first side surface.

4. The electricity storage system according to claim 2, wherein the portable unit is configured to be attachable to and detachable from the first terminal unit by being rotated about a rotation axis extending in a direction intersecting the second side surface.

5. The electricity storage system according to claim 1, wherein the portable unit includes an illuminator, an optical controller that controls switching ON of the illuminator, and an operator that obtains an instruction from a user, and
   the optical controller switches ON the illuminator when the operator obtains an instruction for switching ON the illuminator from the user and when stoppage of power supply from the system power supply to the first storage battery module is detected.

6. The electricity storage system according to claim 1, wherein the portable unit further includes a third terminal unit electrically connectable to an external device, the third terminal unit being used to supply the power to the external device.

7. The electricity storage system according to claim 1, wherein the charging controller that performs control to switch the charging rate for the second storage battery module between a normal mode in which the charging rate is equal to the charging rate for the first storage battery module and the high-speed mode in which the charging rate is greater than in the normal mode.

8. The electricity storage system according to claim 1, wherein the main body includes a power supply unit that is used to supply the power stored in the first storage battery module to the second storage battery module, and the power supply unit is disposed above at least one of the first storage battery module and the second storage battery module.

9. The electricity storage system according to claim 1, wherein the portable unit further includes: a display unit; and a display controller that controls a display mode of the display unit, and the display controller:

sets the display unit to a first display mode when the main body and the portable unit are determined as operating normally; and sets the display unit to a second display mode different from the first display mode when at least one of the main body and the portable unit is determined as operating abnormally.

10. The electricity storage system according to claim 1, wherein the first terminal unit further includes a groove extending diagonally downward from a lateral end of the first terminal unit.

11. The electricity storage system according to claim 10, wherein the portable unit further includes a protrusion, and the protrusion and the groove formed in the first terminal unit are configured to fit each other so as to prevent an unintended detachment of the portable unit from the first terminal unit.

12. The electricity storage system according to claim 11, wherein a rotation of the portable unit allows the protrusion of the portable unit to move along the groove formed in the first terminal unit.

* * * * *